United States Patent
Miyakawa et al.

(10) Patent No.: US 11,667,184 B2
(45) Date of Patent: Jun. 6, 2023

(54) HYBRID ELECTRIC VEHICLE

(71) Applicant: Nissan Motor Co., Ltd., Kanagawa (JP)

(72) Inventors: Takayuki Miyakawa, Kanagawa (JP); Toshio Enomoto, Kanagawa (JP); Koji Tanimura, Kanagawa (JP); Tadashi Nagami, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 61 days.

(21) Appl. No.: 17/595,886

(22) PCT Filed: May 29, 2019

(86) PCT No.: PCT/JP2019/021339
§ 371 (c)(1),
(2) Date: Nov. 29, 2021

(87) PCT Pub. No.: WO2020/240736
PCT Pub. Date: Dec. 3, 2020

(65) Prior Publication Data
US 2022/0227217 A1    Jul. 21, 2022

(51) Int. Cl.
*B60K 6/46* (2007.10)
*B60K 1/00* (2006.01)
*B60K 5/04* (2006.01)
*B62D 3/02* (2006.01)
*B62D 21/11* (2006.01)

(52) U.S. Cl.
CPC .............. *B60K 6/46* (2013.01); *B60K 1/00* (2013.01); *B60K 5/04* (2013.01); *B62D 3/02* (2013.01); *B62D 21/11* (2013.01)

(58) Field of Classification Search
CPC ... B60K 6/46; B60K 1/00; B60K 5/04; B62D 3/02; B62D 21/11
See application file for complete search history.

(56) References Cited

U.S. PATENT DOCUMENTS

| | | | | |
|---|---|---|---|---|
| 5,257,675 A | * | 11/1993 | Araki | B60K 17/06 475/71 |
| 7,726,429 B2 | * | 6/2010 | Suzuki | B62D 21/152 180/232 |
| 2016/0068189 A1 | * | 3/2016 | Imanishi | B22C 9/10 296/204 |
| 2020/0102012 A1 | * | 4/2020 | Sakai | B62D 7/16 |
| 2021/0024132 A1 | * | 1/2021 | Okamoto | B60K 5/04 |

(Continued)

FOREIGN PATENT DOCUMENTS

JP    2016078672 A    5/2016

*Primary Examiner* — Erez Gurari
(74) *Attorney, Agent, or Firm* — Osha Bergman Watanabe & Burton LLP

(57) ABSTRACT

An hybrid electric vehicle (HEV) drives front wheels by a motor-generator via drive shafts by use of electricity generated by an internal combustion engine (ICE). A lower portion of the internal combustion engine is locate on a front side of a lower portion of the motor-generator in the vehicle body with being distanced therefrom. A steering gearbox is placed between the internal combustion engine and the motor-generator and located on a front side of the drive shafts. According to this configuration, driving stability, steering feeling, and noise and vibration can be balanced at a high level.

3 Claims, 4 Drawing Sheets

(56) References Cited

U.S. PATENT DOCUMENTS

2021/0024134 A1* 1/2021 Okamoto ............... B62D 21/15
2021/0276624 A1* 9/2021 Ajisaka .................. B60L 50/71
2022/0227217 A1* 7/2022 Miyakawa ............... B60K 6/48

* cited by examiner

HYBRID ELECTRIC VEHICLE

TECHNICAL FIELD

The present invention relates to a hybrid electric vehicle.

BACKGROUND ART

A Patent Literature 1 listed below discloses an internal combustion engine and a motor for a hybrid electric vehicle. The internal combustion engine and the motor are installed in a front section, i.e. in an engine compartment, of the vehicle body. The motor also functions as a generator that generates regenerative electricity (therefore, it is also called a motor-generator). A steering gearbox is also installed in the engine compartment. Since the internal combustion engine and the motor occupy a large space, the steering gearbox is located behind the internal combustion engine and the motor. More specifically, it is located behind drive shafts that extend from the internal combustion engine and the motor that are drive sources of front wheels as driving wheels. Therefore, the front wheels, which are also steered road wheels, are pushed and pulled by tie rods of the steering gearbox at their rear portions positioning posterior to the drive shafts.

CITATION LIST

Prior-Art Literature

Patent Literature 1: Japanese Patent Application Publication No. 2016-78672

SUMMARY OF INVENTION

It is generally known that front wheels (steered road wheels) are preferably pushed and pulled by tie rods of a steering gearbox at their front portions positioning anterior to their centers in view of "driving stability", "steering feeling" and "noise and vibration". That is, in a case of a front-wheel-drive vehicle, the above-mentioned performances can be balanced at a high level by locating a steering gearbox on a front side of drive shafts. However, in a front-wheel-drive vehicles including the hybrid electric vehicle disclosed in the Patent Literature 1, its steering gearbox cannot be located on a front side of drive shafts due to space constraints in its engine compartment.

Therefore, it is an object of the present invention to provide a front-wheel-drive type hybrid electric vehicle that can balance driving stability, steering feeling, and noise and vibration at a high level.

A hybrid electric vehicle according to an aspect of the present invention drives front wheels by a motor-generator via drive shafts by use of electricity generated by an internal combustion engine. A lower portion of the internal combustion engine is locate on a front side of a lower portion of the motor-generator in the vehicle body with being distanced therefrom. A steering gearbox is located between the internal combustion engine and the motor-generator, and located on the front side of the drive shafts.

DESCRIPTION OF EMBODIMENTS

Hereinafter, a hybrid electric vehicle according to an embodiment will be explained with reference to FIG. 1 to FIG. 4.

Figure 1:
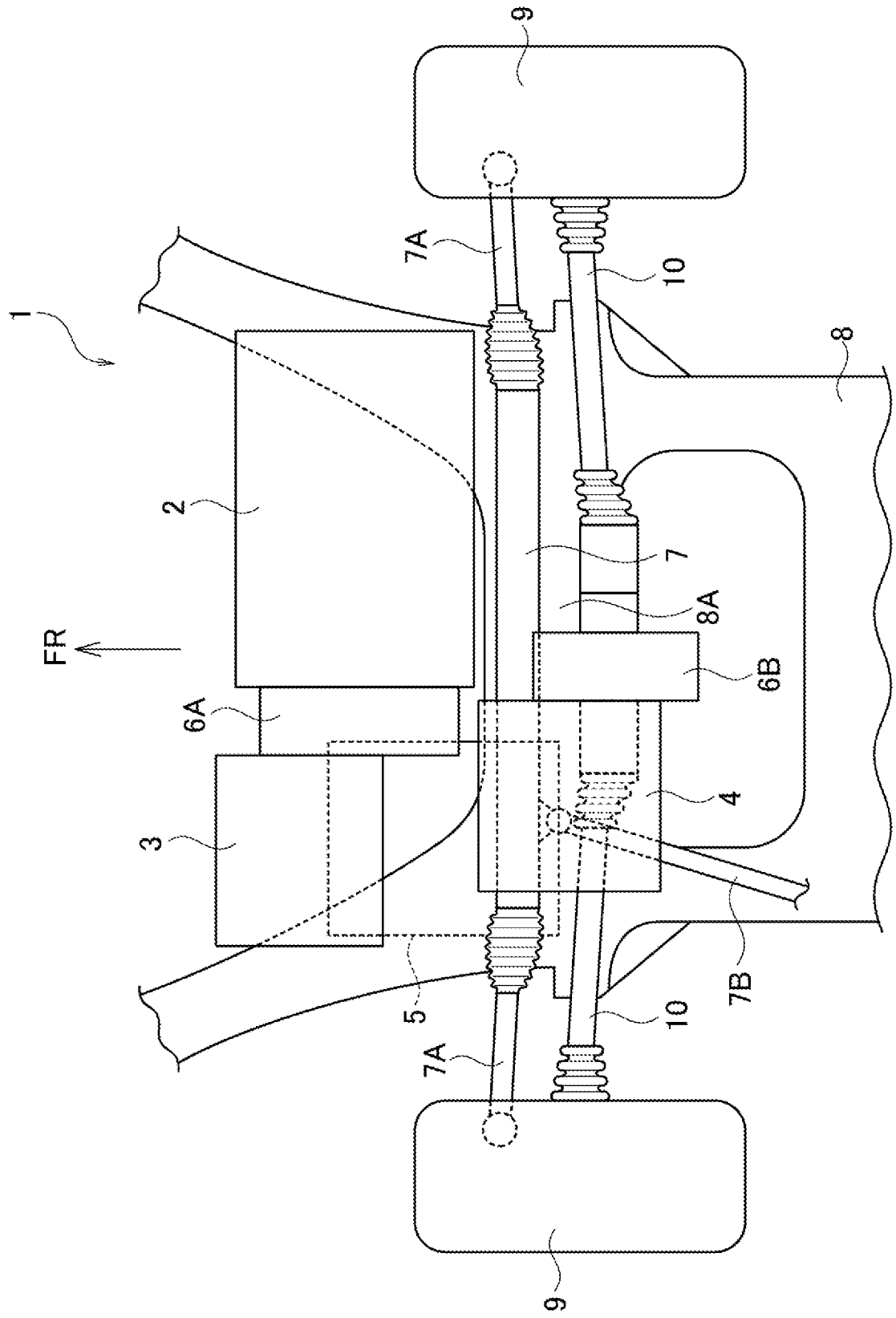
FIG. 1 is a schematic plan view of a front section of a vehicle body in a hybrid electric vehicle according to an embodiment.
Figure 2:
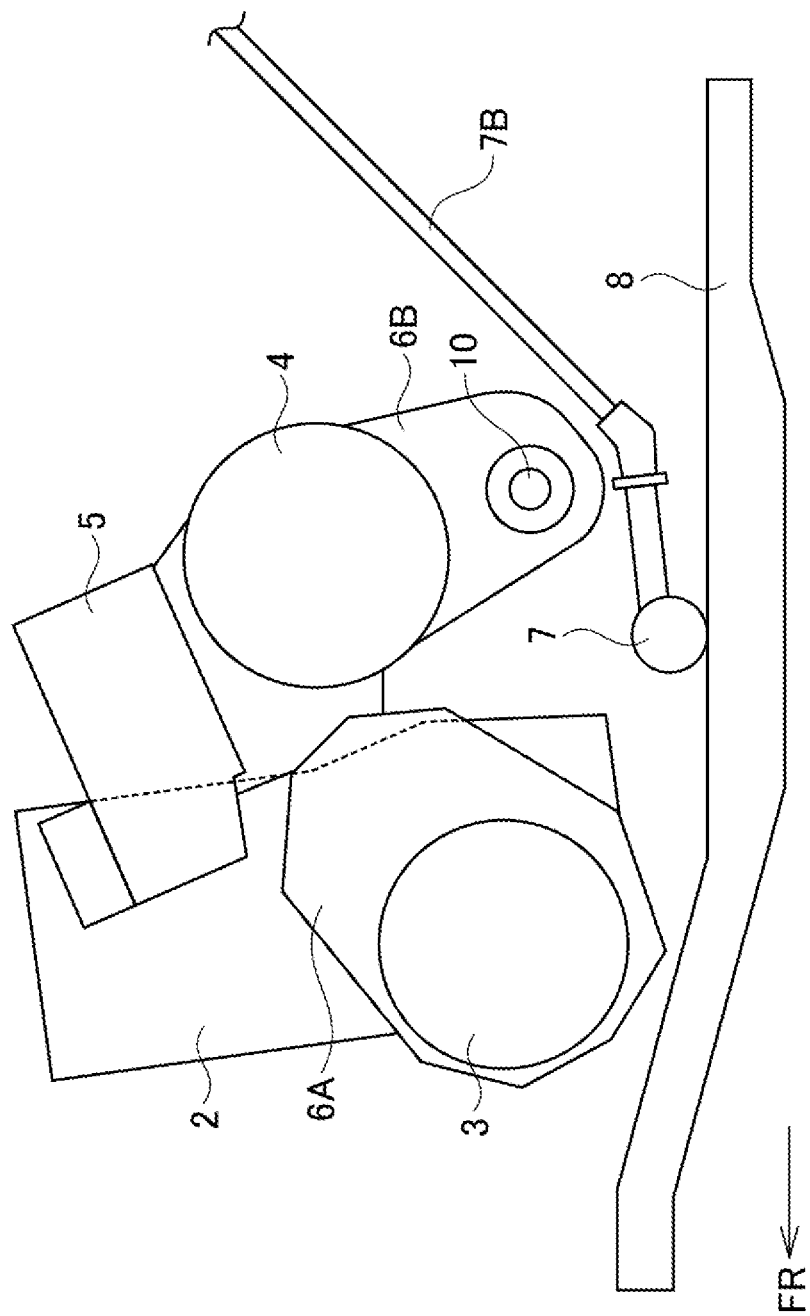
FIG. 2 is a schematic side view of the front section.

As shown in FIG. 1 and FIG. 2, the hybrid electric vehicle (HEV) 1 according to the present embodiment is equipped with an internal combustion engine (ICE) 2, a generator 3, a motor-generator (MG) 4, and an inverter 5 in a front section of the vehicle, specifically in an engine compartment. The generator 3 is mechanically connected with the ICE 2 with a speed-increasing gearbox 6A interposed therebetween. An arrow FR in FIG. 1 and FIG. 2 indicates a forward direction of the vehicle body. The MG 4 is mechanically connected with driving wheels (front wheels) 9 with a reduction gearbox 6B interposed therebetween. The inverter 5 is electrically connected with both the generator 3 and the MG 4. The inverter 5 is also electrically connected with a high-voltage battery, which is not shown in the drawings. Note that the HEV 1 is also equipped with a low-voltage (12V) battery for auxiliary devices. The low-voltage battery is electrically connected with the high-voltage battery with a DC/DC converter built in the inverter 5 interposed therebetween. The output from the DC/DC converter charges the low-voltage battery and is supplied directly to the auxiliary devices. Wiring harnesses for the electrical connections are not shown in the drawings.

A steering gearbox 7, which steers the front wheels 9 that are steered road wheels, is also installed in the engine compartment. The steering gearbox 7 is attached to a suspension member 8 mounted to a lower portion of the front section of the vehicle body. In more detail, the suspension member 8 has a cross member 8A extending in a lateral direction of the vehicle body, and the steering gearbox 7 is mounted on the cross member 8A. Although not shown in the drawings, suspension arms coupled with hub carriers of the front wheels 9 are also attached to the suspension member 8. Tie rods 7A are extended from both ends of the steering gearbox 7, and each outer end of the tie rods 7A is connected to the hub carrier of the front wheel 9. In addition, a steering shaft 7B that transmits rotations of a steering wheel is also connected to the steering gearbox 7.

The HEV 1 according to the present embodiment is a front-wheel-drive vehicle. Therefore, outer ends of drive shafts 10 are connected to the front wheels 9 as drive wheels, respectively. Inner ends of the drive shafts 10 are connected to the above-mentioned reduction gearbox 6B. Output force (driving force) of the MG 4 is transmitted to the front wheels (drive wheels) 9 via the reduction gearbox 6B and the drive shafts 10. In other words, the MG 4 is mechanically connected with the front wheels 9 via the drive shafts 10 (and the reduction gearbox 6B). Note that electricity regenerated by the MG 4 during deceleration of the HEV 1 can be also supplied to the high-voltage battery via the inverter 5.

The HEV 1 according to the present embodiment adopts a series hybrid system. Output force (driving force) of the ICE 2 is not transmitted to the front wheels (drive wheels) 9, but is transmitted to the generator 3 via the speed-increasing gearbox 6A. In other words, the generator 3 is mechanically connected with the ICE 2. The electricity generated by the generator 3 is supplied to the MG 4 or (and) the high voltage battery via the inverter 5. The electricity stored in the high-voltage battery can be also supplied to the MG 4. The output power (driving power) of the ICE 2 in the present embodiment does not run the HEV 1, but is used only for the power generation. Therefore, the ICE 2 functions as part of a power generation apparatus.

An aluminum alloy housing of the generator 3 is rigidly attached to an aluminum alloy housing of the speed-increasing gearbox 6A. An aluminum alloy (or cast iron) engine block of the ICE 2 is also rigidly attached to the housing of the speed-increasing gearbox 6A on the opposite side of the generator 3. An aluminum alloy housing of the MG 4 is rigidly attached to the aluminum alloy housing of the reduction gearbox 6B. The inverter 5 also has an aluminum alloy housing. Since the inverter 5 is electrically connected with both the generator 3 and the MG 4, it is located above both the generator 3 and the MG 4.

Figure 3:
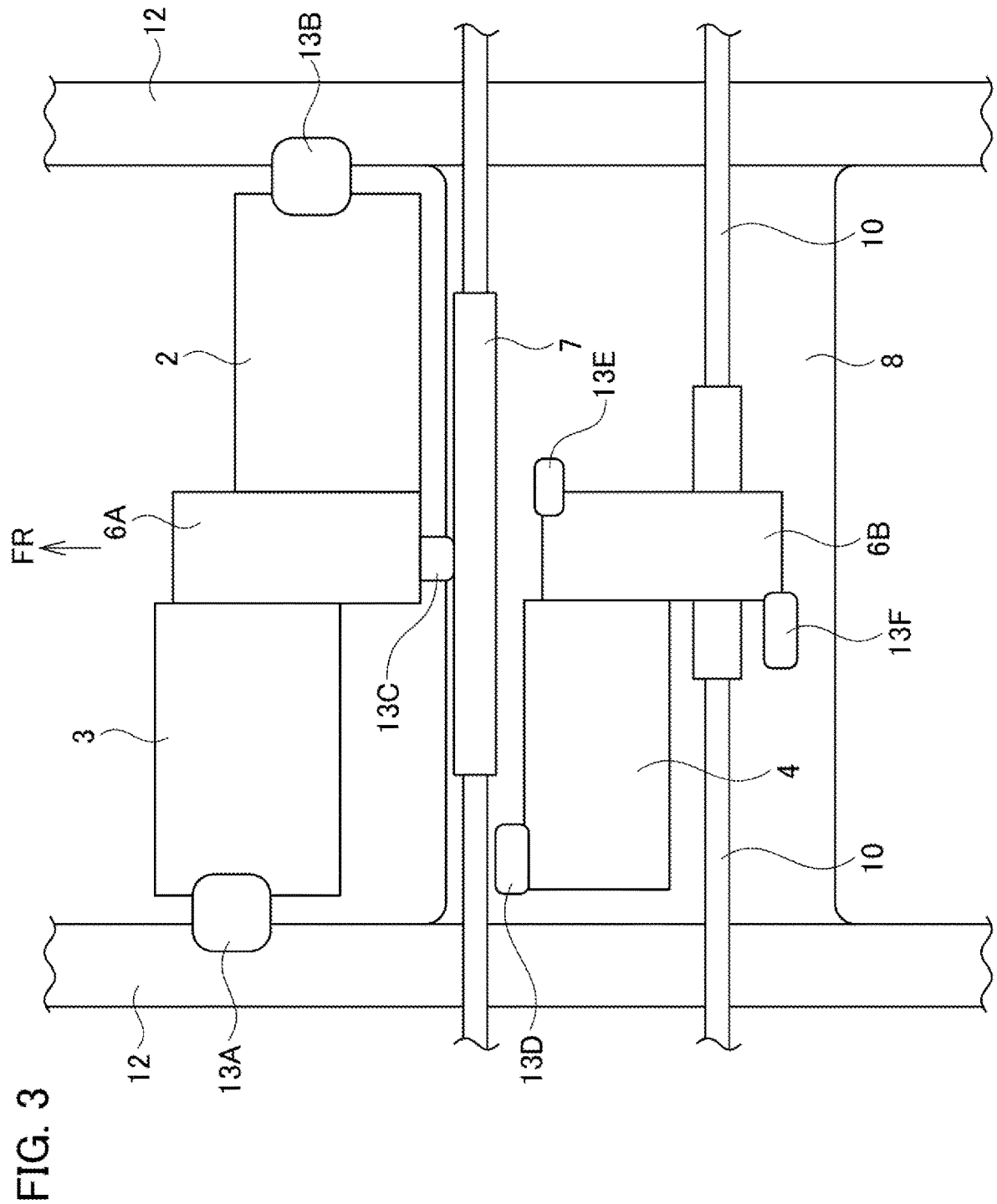
FIG. 3 is a schematic plan view showing mount positions of an internal combustion engine and so on in the front section.
Figure 4:
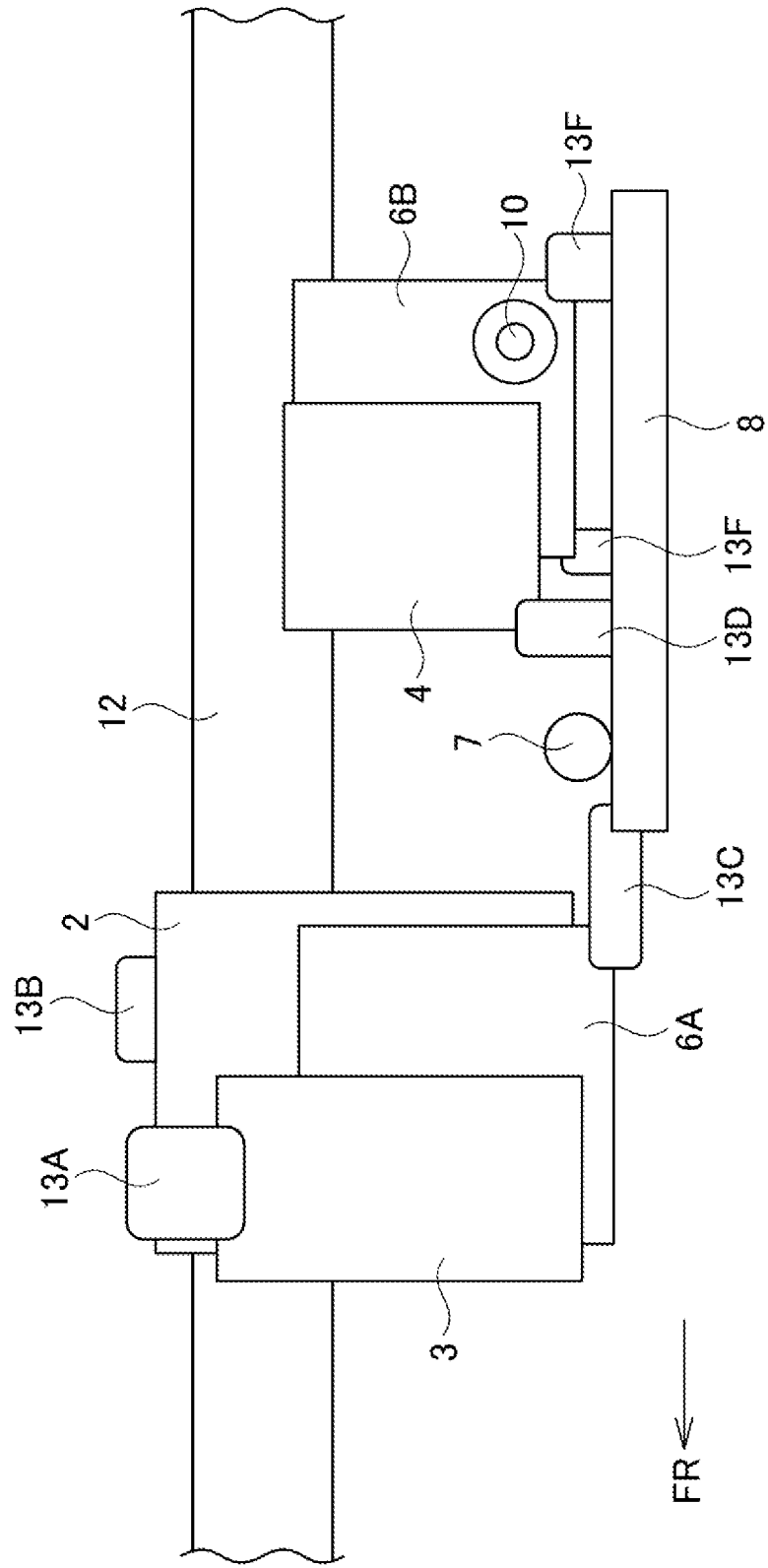
FIG. 4 is a schematic side view showing the mount positions of the internal combustion engine and so on in the front section.

Mountings of the ICE 2, the generator 3, the MG 4 and others on the vehicle body will be explained with reference to FIG. 3 and FIG. 4 (schematic views). Both ends of the ICE 2, the speed-increasing gearbox 6A and the generator 3, which are rigidly connected in series, are mounted on a pair of side members 12 extending in a longitudinal direction of the vehicle body. Specifically, the generator 3 is mounted on the left side member 12 via a generator mount 13A, and the ICE 2 is mounted on the right side member 12 via the engine mount 13B. In addition, a bottom of the speed-increasing gearbox 6A at the center is mounted on a front edge (i.e., on the cross member 8A: see FIG. 1) of the suspension member 8 below the side members 12 via a gearbox mount 13C. The gearbox mount 13C functions as a so-called torque rod and regulates swinging of the ICE 2 in the longitudinal direction at a start of running and at accelerating/decelerating.

On the other hand, the MG 4 and the reduction gearbox 6B, which are rigidly connected to each other, are located on the left side of the vehicle body, i.e. behind the generator 3. The left front bottom of the MG 4 is mounted to the suspension member 8 via an MG mount 13D. Similarly, the right front bottom of the reduction gearbox 6B is mounted to the suspension member 8 via a gearbox front mount 13E, and the left rear bottom of the reduction gearbox 6B is mounted to the suspension member 8 via a gearbox rear mount 13F. The MG 4 and the reduction gearbox 6B may swing in the longitudinal direction due to a reactive torque force from the front wheels 9 at a start of running and at accelerating/decelerating, but the gearbox front mount 13E and the gearbox rear mount 13F regulate this swinging.

Next, the arrangement of the ICE 2, the generator 3, the MG 4 and so on will be explained. In the present embodiment, the ICE 2 and the generator 3 as the power generation apparatus are separated from the MG 4 as a drive mechanism. (The power generation apparatus and the drive mechanism are electrically connected via wiring harnesses and so on.) Therefore, vibrations due to the ICE 2 and vibrations due to the driving system (vibrations due to the MG 4 and vibrations of from a road surface) can be separated from each other. Since two types of the vibrations do not interfere with each other, it is convenient in view of noise and vibration. In addition, the ICE 2 may shake at its starting and stopping, and the MG 4 and the reduction gearbox 6B may swing in the longitudinal direction due to the reactive torque. Therefore, separating the power generation apparatus from the drive mechanism will surely prevent contacts between the former and the latter.

Here, as shown in FIG. 2, the MG 4 and the reduction gearbox 6B (and the inverter 5) are tilted forward, and the lower portion of the ICE 2 is distanced from the lower portion of the MG 4. In other words, the lower portion of the ICE 2 is located on a front side of the lower portion of the MG 4 in the vehicle body with being distance therefrom. Therefore, a space is formed between the lower portion of the ICE 2 and the lower portion of the MG 4 to extend the steering gearbox 7 in the lateral direction. As a result, the steering gearbox 7 can be located on the front side of the drive shafts 10, and thereby driving stability, steering feeling, and noise and vibration can be balanced at a high level.

In the same way that the lower portion of the ICE 2 is distanced from the lower portion of the MG 4, the upper portion of the ICE 2 is also distanced from the upper portion of the MG 4 (they are not contacted nor coupled with each other). In other words, the upper portion of the ICE 2 is located on a front side of the MG 4 in the vehicle body with being distanced therefrom. However, since the MG 4 and the reduction gearbox 6B are tilted forward as described above, the distance in the longitudinal direction between the upper portion of the ICE 2 and the upper portion of the MG 4 is shorter than the distance in the longitudinal direction between the lower portion of the ICE 2 and the lower portion of the MG 4. As a result, a space can be formed behind the MG 4 (and the inverter 5). Since the left front seat is the driver's seat in the HEV 1, even if a brake master cylinder is placed in the space behind the MG 4, the MG 4 and the brake master cylinder will not come into contact with each other due to swinging of the MG 4 described above.

The ICE 2 in the present embodiment is specialized for the power generation and is a small-displacement, less-cylinder engine (e.g., three cylinders of 1.2 to 1.5 liters). However, since it is an internal combustion engine, it has a larger mass than the generator 3 or the MG 4. Therefore, in the present embodiment, the ICE 2 is installed on the right side of the vehicle body, while the generator 3 and the MG 4 are installed on the left side. In other words, the generator 3 is located on a front side of the MG 4. As a result, the masses on the left and right sides in the front section of the vehicle body can be balanced. This mass balance is convenient for driving stability and steering feeling. In addition, a space can be formed behind the ICE 2 and on the right side of the MG 4, and thereby the exhaust system of the ICE 2 can be placed in this space. Since a large volume exhaust purification catalyst is placed immediately downstream of the ICE 2 for early warm-up in recent exhaust systems, it improves the space efficiency in the engine compartment.

In the HEV 1 of the present embodiment, the lower portion of the ICE 2 is located on the front side of the lower portion of the MG4 with being distanced therefrom, and the steering gearbox 7 is located between the ICE 2 and the MG 4 and located on the front side of the drive shafts 10. In other words, the steering gearbox 7 can be located in the space formed between the lower portion of the ICE 2 and the lower portion of the MG 4, and the drive shafts 10 are located behind the steering gearbox 7. In this way, toe-out of the front wheels on a turning outer side can be achieved by compliance steer without reducing the mounting rigidity of each portion of the steering mechanism, and driving stability, steering feeling, and noise and noise and vibration can be balanced at a high level. Although there is a trade-off relationship among these three performances, they can be balanced at a high level according to the present embodiment.

In addition, in the HEV 1 according to the present embodiment, the upper portion of the ICE 2 is also located on the front side of the upper portion of the MG 4 with being distanced therefrom, and the distance between the ICE 2 and the MG 4 in the longitudinal direction at their upper portions is shorter than the distance between the ICE 2 and the MG 4 in the longitudinal direction at their lower portions. Therefore, the ICE 2 and the MG 4 are distanced from each other at their lower portions to install the steering gearbox 7, but the space efficiency in the engine compartment can be improved by shortening the distance between the ICE 2 and the MG 4 at their upper portions. In addition, in consideration of swinging of the ICE 2 and the MG 4 in the longitudinal direction, space margins can be provided around the upper portions.

Further, in the HEV 1 according to the present embodiment, the generator 3 is located on the front side of the MG 4. The ICE 2 is mounted on the one of the side members 12, and the generator 3 is mounted on the other of the side members 12. The steering gearbox 7 is mounted on the cross member 8A of the suspension member 8. The MG 4 and the reduction gearbox 6B are mounted on the suspension member 8. By installing the ICE 2 having a large mass on the one side in the width direction of the vehicle and installing the generator 3 and the MG 4 on the other side, the masses on the left and right sides in the front section of the vehicle body can be balanced. This mass balance is convenient for driving stability and steering feeling.

Furthermore, although the drive shafts 10 are connected to the reduction gearbox 6B accompanied by the MG 4, the reduction gearbox 6B can be installed in the approximate center of the lateral direction. Therefore, the lengths of the paired drive shafts 10 can be made equal each other. This is also convenient for driving stability and steering feeling. By mounting the reduction gearbox 6B (and the MG 4), to which the drive shafts 10 are connected and which receives the reactive torque from the front wheels (drive wheels) 9, on the suspension member 8, vibration in the drive system can be absorbed and damped. In particular, since the MG 4 can provide high torque from the start of its rotation, mounting the reduction gearbox 6B (and the MG 4) on the suspension member 8 is convenient for noise and vibration.

Note that the present invention is not limited to the embodiment described above. In the above embodiment, the ICE 2 is installed on the right side of the vehicle body and the MG 4 is installed on the left side. However, the ICE 2 may be mounted on the left side of the vehicle body and the MG 4 on the right side. In either case, the driver's seat may be the left front seat or the right front seat. Further, in the above embodiment, the generator 3 and the MG 4 were completely separated from each other. Although such a configuration is preferable in view of noise and vibration as described above, their upper portions may be jointed with each other as long as the lower portion of the ICE 2 (the generator 3) and the lower portion of the MG 4 are distanced from each other for installing the steering gearbox 7. For example, the engine block of the ICE 2 and the housings of the speed-increasing gearbox 6A, the generator 3, the MG 4 and the inverter 5 may be integrally formed or rigidly attached to each other.

REFERENCE SIGNS LIST 1 hybrid electric vehicle (HEV)
2 internal combustion engine (ICE)
3 generator
4 motor-generator (MG)
6A speed-increasing gearbox
6B reduction gearbox
7 steering gearbox
8 suspension member
8A cross member
9 front wheels (drive wheels, steered road wheels)
10 drive shafts
12 side members
13A generator mount
13B engine mount
13C gearbox mount
13D MG mount
13E gearbox front mount
13F gearbox rear mount

The invention claimed is:

1. An hybrid electric vehicle comprising:
a motor-generator that is installed in a front section of a vehicle body and mechanically connected with front wheels as drive wheels via drive shafts;
an internal combustion engine that is installed in the front section of the vehicle body and generates electricity to be supplied to the motor-generator; and
a steering gearbox that extends in a lateral direction of the vehicle body and steers the front wheels,
wherein a lower portion of the internal combustion engine is located on a front side of a lower portion of the motor-generator in the vehicle body with being distanced therefrom, and
wherein the steering gearbox is located between the internal combustion engine and the motor-generator and located on a front side of the drive shafts in the vehicle body.

2. The hybrid electric vehicle according to claim 1,
wherein an upper portion of the internal combustion engine is located on a front side of an upper portion of the motor-generator in the vehicle body with being distanced therefrom, and
wherein a distance in a longitudinal direction of the vehicle body between the upper portion of the internal combustion engine and the upper portion of the motor-generator is shorter than a distance in the longitudinal direction between the lower portion of the internal combustion engine and the lower portion of the motor-generator.

3. The hybrid electric vehicle according to claim 2, further comprising
a pair of side members that extend in the longitudinal direction in the front section of the vehicle body;
a suspension member that attached to the vehicle body below the pair of front side members;
a generator that is rigidly attached to the internal combustion engine with a speed-increasing gearbox interposed therebetween; and
a reduction gearbox that is rigidly attached to the motor-generator and to which the drive shafts are connected,
wherein the suspension member has a cross member to which the steering gearbox is attached and that extends in the lateral direction,
wherein the generator is located on a front side of the motor-generator in the vehicle body,
wherein the internal combustion engine is mounted on one of the side members,
wherein the generator is mounted on another of the side members, and
the motor-generator and the reduction gearbox are mounted on the suspension member.

* * * * *